United States Patent [19]

Barrett

[11] 4,245,920

[45] Jan. 20, 1981

[54] INTERCONNECTABLE MOLECULAR MODELS AND A FASTENER FOR CONNECTING SAME

[76] Inventor: Edward J. Barrett, 1725 York Ave., New York, N.Y. 10028

[21] Appl. No.: 828,158

[22] Filed: Aug. 26, 1977

[51] Int. Cl.³ .............................................. F16D 1/12
[52] U.S. Cl. ................................... 403/305; 403/348
[58] Field of Search ............... 403/229, 300, 303, 304, 403/305, 348, 349; 24/221 R

[56] References Cited

U.S. PATENT DOCUMENTS

| | | |
|---|---|---|
| 645,079 | 3/1900 | Finley . |
| 1,199,690 | 9/1916 | Gillan ................... 24/221 R |
| 1,670,654 | 5/1928 | Delaney . |
| 2,015,559 | 9/1935 | Holm . |
| 2,438,313 | 3/1948 | Burton .................. 403/300 |
| 3,333,349 | 8/1967 | Brumlik . |
| 3,393,795 | 7/1968 | Covert, Jr. . |
| 3,510,962 | 5/1970 | Sato . |
| 4,030,209 | 6/1977 | Dreiding ............... 403/166 X |

FOREIGN PATENT DOCUMENTS 33046  1/1928  France ..................... 403/349

*Primary Examiner*—Andrew V. Kundrat
*Attorney, Agent, or Firm*—Pennie & Edmonds

[57] ABSTRACT

A mechanical fastener is disclosed for joining two plugs in coaxial alignment and in a plurality of relative orientations. The fastener is particularly adapted for use in joining models of molecular constituents to assemble models of larger molecular structures. Models of molecular constituents are disclosed which incorporate a plug having a generally cylindrical shank extending along an axis corresponding to a chemical bond and at least one tab projecting outward from the surface of the shank. Broadly, the fastener comprises a hollow housing which includes a first and a second end wall and a side wall extending between the two end walls. The end walls and the side wall define a cavity within the housing. Each end wall has a plug-receptacle opening passing through it shaped and dimensioned to receive a plug. The surface of each end wall which faces the cavity has a plurality of grooves therein extending radially outwardly from the plug-receptacle opening and spaced apart azimuthally around the opening. The grooves are oriented and configured to accommodate the tab from the plug.

10 Claims, 7 Drawing Figures

INTERCONNECTABLE MOLECULAR MODELS AND A FASTENER FOR CONNECTING SAME

BACKGROUND OF THE INVENTION

A. Field of the Invention

The present invention relates to a fastener for joining two plugs in coaxial alignment and in a plurality of relative orientations about the axis of alignment. Such fasteners are useful for joining models of molecular constituents to assemble models of complete molecular structures.

B. Description of the Prior Art

Models for illustrating molecular structures have been used by researchers and educators for over 100 years. Many different designs for molecular models have been described and a number of types of such models are commercially available. Molecular models presently in wide use are discussed in the following two articles:

"The Use of Models in Stereochemistry," Anne Walton, *Progress in Stereochemistry*, 4, 335-375(1968); and "A Survey of Atomic and Molecular Models," Arnold J. Gordon, *J. Chem. Educ.*, 47, 30-32(1970).

Because of the virtually infinite number of molecular structures found in nature, it is impractical to market only models of complete molecular structures. Instead, sets are available which include models of a number of atoms, functional groups, or other molecular constituents. The user selects the appropriate molecular constituents from the set and connects them together to assemble a model of the complete molecular structure of interest.

The mechanism by which such models of molecular subunits are joined together has been a source of recurring problems in the prior art. Difficulties arise because molecules can be made up of a great number of atoms, and thus models of such molecules are often large, unwieldly structures which tend to distort easily from the correct configuration. In order to obtain the maximum benefit from a model of a molecule, it is desirable to be able to view the model from any orientation. For this reason, it is desirable to be able to handle the model, which requires that the model be capable of maintaining its structural integrity when held in any orientation. Thus connections between the subunits of a molecular model are preferably rigid and mechanically secure. On the other hand, it is desirable that the mechanism by which the subunits are interconnected permit rapid assembly and disassembly of the model.

A further difficulty concerns the angular relationships among the subunits making up a molecular model. Models of molecular constituents are typically connected along chemical bonds within a molecule. In nature, the orientation which a molecular constituent assumes relative to another molecular constituent bonded to it is not fixed, but in general varies from molecule to molecule and can even vary among different configurations of the same molecule. Thus the mechanism for joining two models of molecular constituents along a chemical bond should be capable of joining the models both rigidly and in a variety of different relative orientations about the axis of the bond.

A widely used set of molecular models are the "framework molecular models" described U.S. Pat. No. 3,333,349 to Brumlik. Framework molecular models include coupling elements which represent atomic valence clusters and consist of thin cylindrical arms meeting at a center point corresponding to the center of an atom. Coupling elements representing atoms are joined by sections of elastomeric tubing which represent bonds. The tubing sections are of a size to receive the cylindrical arms of the coupling elements and to retain them by friction. Because the frictional connection is of limited strength, the size of molecular models which can be assembled from framework molecular models is limited. The weight of large molecular models tends to cause the frictional couplings to slip, thereby distorting the molecular structure. For very large molecular models, such frictional couplings can actually pull apart under the weight of the model.

A second type of molecular models, referred to as the Kendrew skeletal models, provides a more secure coupling between molecular constituents. The Kendrew skeletal models are described in the article by Walton cited above at pages 364-365. The models consist of units made of rigid brass rod. To connect two units, the ends of two rods are inserted into a small metal barrel which has two screws passing through its sides. The screws are tightened until they lock into grooves at the ends of the rods, thereby connecting the rods rigidly. However, assembly of a large molecule from the Kendrew skeletal models is an extremely slow and tedious process since it involves the tightening of two screws for each unit to be joined. To construct a model representing a large biochemical molecule, it may be necessary to make hundreds of such connections.

SUMMARY OF THE INVENTION

I have invented a fastener for joining two plugs in coaxial alignment which permits models of molecular constituents equipped with the plugs to be connected together securely at different relative orientations while avoiding problems which have plagued the prior art.

The fastener of the present invention is adapted to join two plugs in coaxial alignment and in a plurality of relative orientations about the axis of alignment. Each plug has a generally cylindrical shank and at least one tab projecting outward from the surface of the shank.

Broadly, the fastener of the present invention comprises a hollow housing which includes a first and a second end wall and a side wall extending between the two end walls. The side wall and the two end walls define a cavity within the housing. Each end wall has a plug-receptacle opening therein which includes a generally circular opening and at least one slot extending radially outwardly from the circumference of the circular opening. The circular opening and slot are dimensioned to receive respectively the shank and the tab of the plug. The plug-receptacle opening thereby permits an end portion of the plug including the tab to be inserted through the end wall into the cavity. The two plug-receptacle openings are positioned and oriented with respect to one another to guide plugs inserted through them so that the directions of insertion are substantially collinear. The surface of each end wall which faces the cavity has a plurality of grooves therein. The grooves extend radially outwardly from the circumference of the plug-receptacle opening and are spaced apart azimuthally around the circumference to define a series of plug-orientation angles. The grooves are configured to accommodate the tab of the plug.

The fastener further comprises seating means located within the cavity for exerting a force on a plug inserted in the plug-receptacle opening in opposition to the direction of insertion, thereby urging the plug towards the end wall through which the plug was inserted. The seating means includes a compression element and a first and a second contact surface. The first and second contact surfaces are positioned to intercept plugs inserted respectively through the plug-receptacle openings in the first and second end walls. The compression element is positioned between the two contact surfaces such that the force on a plug is transmitted from the compression element to the plug by a contact surface. Each contact surface is configured to permit plugs which are inserted through a plug-receptacle opening and are in contact with the surface to be rotated so that the tab of the plug can be positioned adjacent to a groove in the end wall. The seating means is thereby adapted to urge the tab into the groove, seating the plug in the fastener.

Models of atoms, functional groups, and other molecular constituents can be fitted with plugs as described above, preferably extending along axes corresponding to chemical bonds. The fastener of the present invention permits such models of molecular constituents to be quickly and securely connected together. The present invention can be used to advantage with molecular models of a number of different types, including both the space filling and the skeletal varieties. Moreover, the fastener can be used in other applications requiring a mechanical connection which do not involve molecular models.

Certain preferred embodiments of the present invention include a first tab and a second tab on each plug. The two tabs project outward from the surface of the shank of the plug and are separated from one another in the azimuthal direction to define a tab-separation angle. The plug-receptacle opening in each end wall of the fastener of these embodiments includes, in addition to a generally circular opening, two slots separated from one another azimuthally by the tab-separation angle. Each plug-receptacle opening thereby permits an end portion of a plug including the two tabs to be inserted through the end wall into the cavity of the fastener. The grooves in each end wall can be grouped in pairs with the two grooves of each pair being separated by the tab-separation angle.

Because a plurality of grooves are provided in each end wall of the fastener, two plugs can be joined at different relative orientations about the axis joining them. This feature is particularly useful in constructing molecular models. Thus, for example, if each plug has two tabs separated from one another by 180° and if the grooves in each end wall of a fastener are located at 30° intervals from the slots in the plug-receptacle opening, then two plugs can be joined at a relative orientation within ±15° from any desired relative orientation. It will be recognized that other angular spacings of grooves can be used if desired. In preferred embodiments of the present invention the tabs are thin compared to the diameter of the shank to permit the grooves to be closely spaced.

The relative orientations by which two plugs can be joined by a fastener of the present invention depend upon the angular positions of the grooves in each end wall considered individually and upon the orientation of the first and the second end walls relative to one another. Consequently, a set of four different fasteners, each of the four fasteners having grooves separated at 30° as described above, but having angular offsets between the first and the second end walls of 0°, 5°, 10°, and 15°, respectively, permits two plugs to be joined at a relative orientation within ±2.5° of any desired relative orientation. Offsets of 20° and 25° are obtained by reversing end-to-end the direction of the two fasteners having 10° and 5° offsets respectively. For molecular models, determining relative orientations of pairs of molecular constituents about the bonds joining them to within ±2.5° is adequate for all but the most exacting applications.

The relative orientation of two plugs joined by a fastener of the present invention can be readily changed simply by pressing one of the plugs into the fastener to unseat its tab from the groove, rotating the plug to position the tab adjacent to a second groove, and then releasing the plug to allow the tab to be seated in the second groove.

The fastener of the present invention is sufficiently compact to permit scale models of molecular constituents to be coupled along molecular-bond axes with the length of the connection corresponding to the chemical bond length.

An additional feature of the fastener of the present invention is that it can be manufactured quite inexpensively. In a preferred embodiment, for example, the fastener is assembled from only five parts: two molded-plastic pieces which are bonded together to form the housing, a coil spring, and two thin metal discs.

BRIEF DESCRIPTION OF THE DRAWINGS

Preferred embodiments of the invention are described below with reference to the following drawings.

FIG. 6 is an elevation illustrating a fastener of the present invention connecting two models of molecular constituents of the present invention.

DESCRIPTION OF PREFERRED EMBODIMENTS

Figure 1:
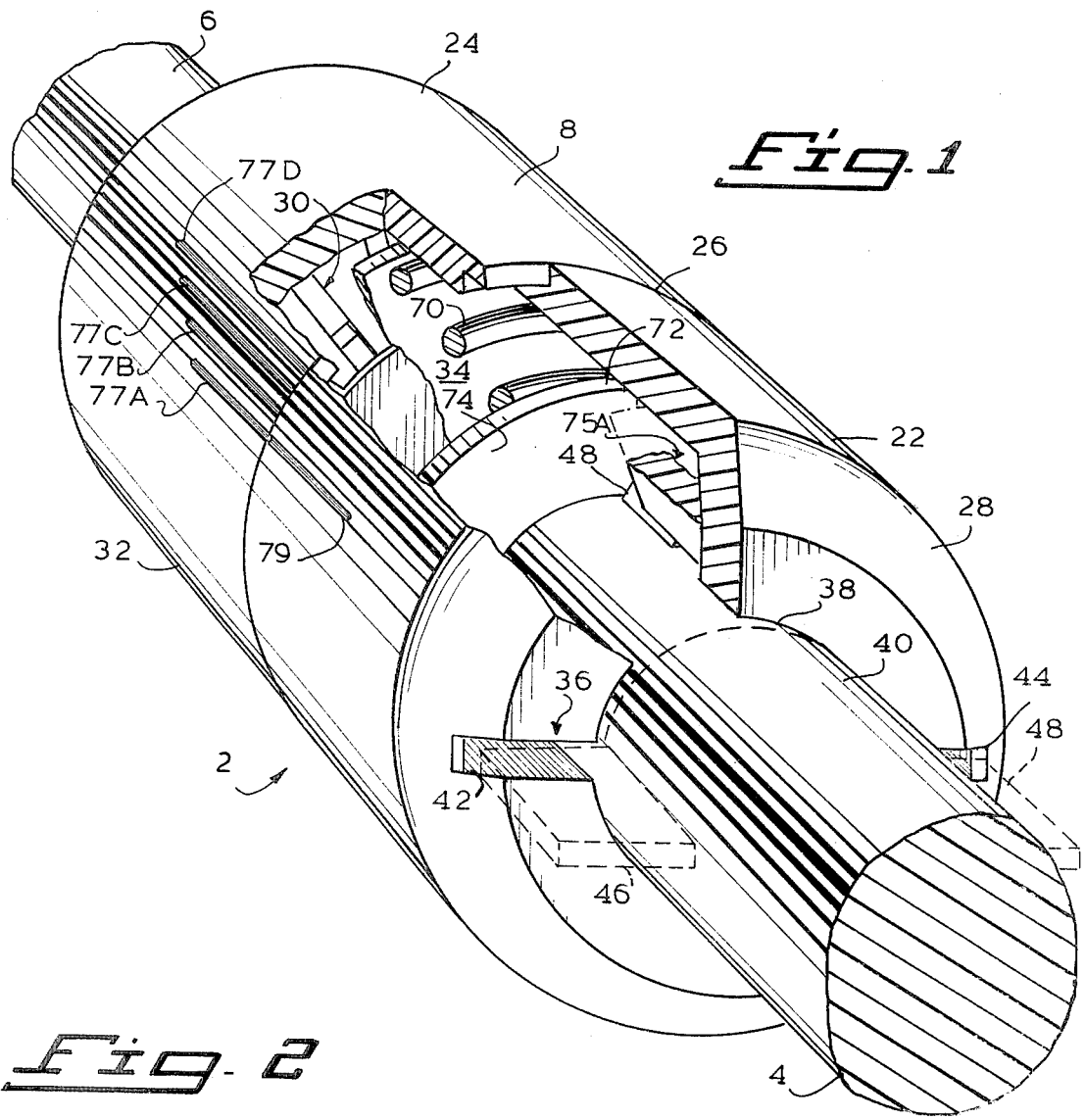
FIG. 1 is a partial-cutaway perspective illustrating a first embodiment of a fastener and two plugs of the present invention.

Referring now to FIG. 1, a fastener 2 for joining a first plug 4 and a second plug 6 in coaxial alignment has a generally cylindrical housing 8.

The two plugs 4 and 6 are identical in construction to a plug 10, seen best in FIG. 6. The plug 10 includes a cylindrical shank 12 of circular cross section and a first tab 14 and a second tab 16 projecting radially outwardly from the shank 12 at an end of the shank. The first and second tabs 14 and 16 are separated in an azimuthal direction by 180° to define a tab-separation angle of 180°. The tabs 14 and 16 are thin blades of generally rectangular shape oriented parallel to the cylinder axis of the shank 12. The blade thickness of the tabs is substantially less than the diameter of the shank 12, the blade thickness of a tab being defined to be a dimension measured generally parallel to a tangent to the surface of the shank at a point where the tab is connected to the shank and generally perpendicular to the cylinder direction of the shank. The plug 10 is preferably made of a high-strength plastic material such as glass-filled nylon. If desired, a thin metal insert can be embedded in the plug 10 to reinforce the tabs 14 and 16.

Referring again to FIG. 1, the housing 8 is made up of a first cup-shaped shell 22 and a second cup-shaped shell 24 which are positioned in coaxial alignment with the lips of the cups abutting one another. The two cup-shaped shells 22 and 24 are preferably manufactured by injection molding a plastic material such as acrylonitrile-butadiene-styrene (ABS) copolymer and are bonded together by an adhesive along an annular joint 26 defined by the lips of the cups.

The bases of the first and the second cup-shaped shells 22 and 24 of FIG. 1, respectively, define the first and the second end walls 28 and 30 of the housing 8, and the side walls of the two cup-shaped shells together define a side wall 32 of the housing 8 which extends between the first and the second end walls 28 and 30. The first and the second end walls 28 and 30 and the side wall 32 define a cavity 34 within the housing.

The end wall 28 has a plug-receptacle opening 36 passing through it for receiving the plug 4. The plug-receptacle opening 36 includes a generally circular opening 38, whose diameter is sufficiently great to receive a shank 40 of the plug 4, and a first slot 42 and a second slot 44 separated from one another in an azimuthal direction by 180°. The plug 4 has a first tab 46 and a second tab 48 disposed at an end of the shank 40 as shown for plug 10 in FIG. 6. An end of the plug 4 can be inserted through the plug-receptacle opening 36 with the first and the second tabs 46 and 48 passing into the cavity 34 through the first and the second slots 42 and 44 of the plug-receptacle opening 36.

Figure 2:
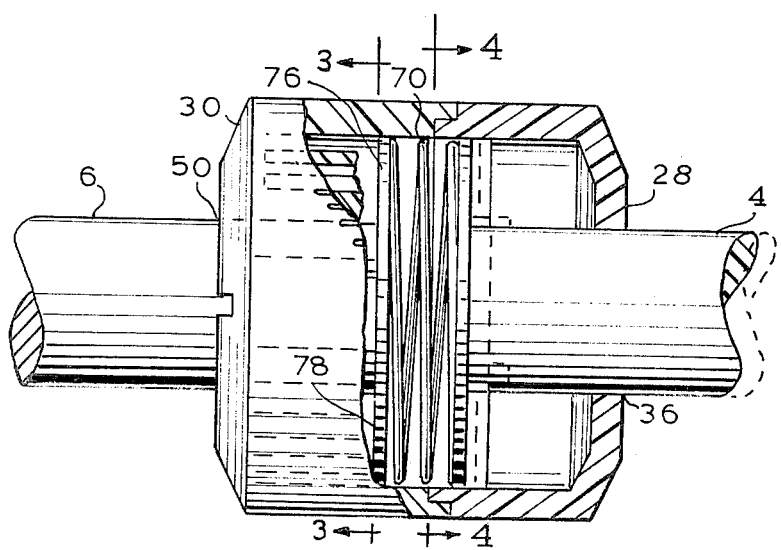
FIG. 2 is an elevation in partial section of the fastener and plugs of FIG. 1.
Figure 3:
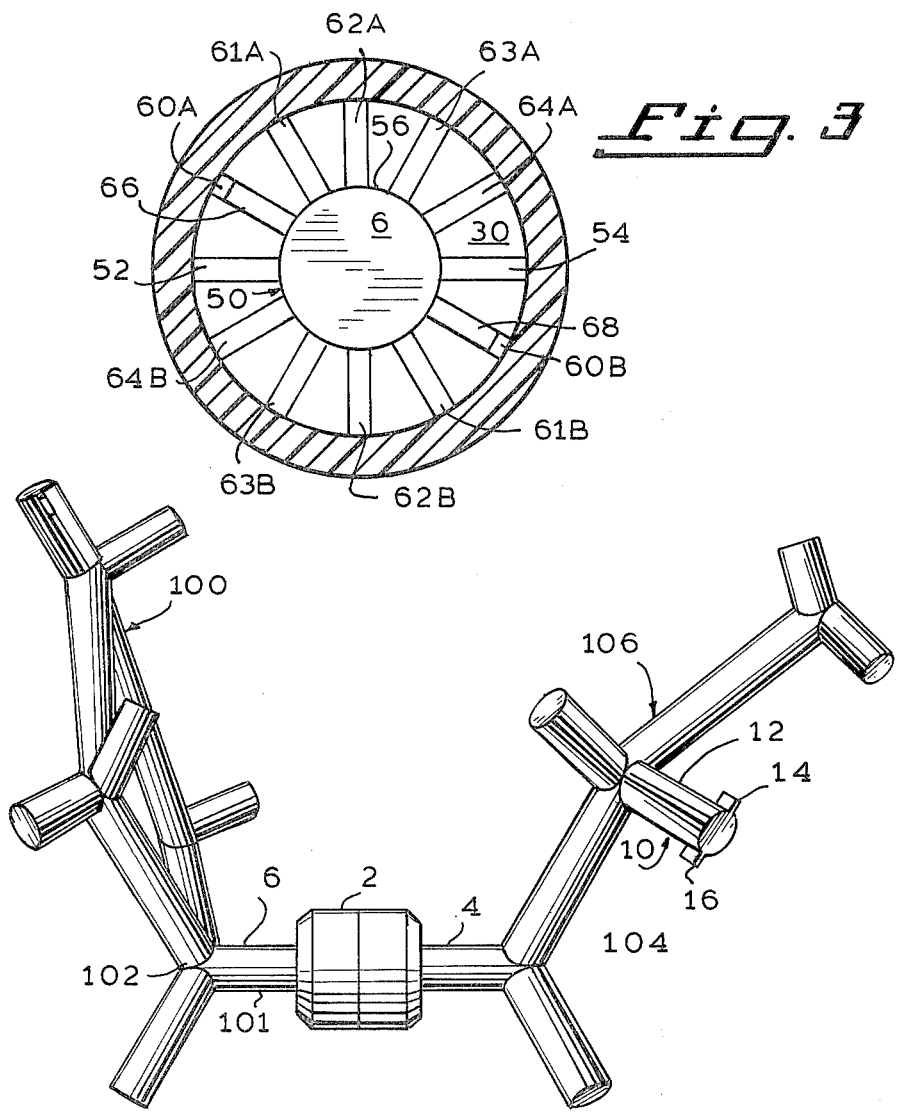
FIG. 3 is a partial-cutaway cross section taken substantially along line 3—3 of FIG. 2.

As may be seen best in FIG. 3, the second end wall 30 similarly has a plug-receptacle opening 50 which includes a first slot 52, a second slot 54 and a generally circular opening 56 for receiving an end of the plug 6. Referring to FIG. 2, the first plug-receptacle opening 36 and the second plug-receptacle opening 50 are positioned in coaxial alignment and are oriented in parallel to guide the plugs 4 and 6 so that the directions of insertion are substantially collinear and the two plugs when seated in the fastener 2 are in substantial coaxial alignment.

Referring again to FIG. 3, five pairs of grooves 60A-64B are molded into the second end wall 30. The grooves 60A-64B extend radially outwardly from the circumference of the circular opening 56. The two grooves of each pair are separated from one another in an azimuthal direction by 180°, the tab-separation angle, and are configured to accommodate a first tab 66 and a second tab 68 of the second plug 6. The depth of the grooves 60-4 in the axial direction is preferably less than the height in the axial direction of the tabs 66 and 68 so that each tab can be urged against a base of a groove when the plug 6 is seated in the fastener 8, thereby fixing the depth of insertion of the plug in the fastener. In cross section taken perpendicular to a radial direction along which the groove extends, the grooves 60-4 are preferably trapezoidal in shape. The width at the open end of a groove preferably exceeds the width of a tab to facilitate guiding the tab into the groove. The width at the base (closed end) of a groove preferably is sufficiently less than the width of a corresponding portion of a tab to grip the sides of the tab when it is seated in the groove, thereby fixing the orientation of the plug; but not so much less than the width of the tab as to prevent the tab from resting against the base of the groove. As will be recognized, the optimum relative width of the tabs and the grooves will depend upon the elastic and frictional characteristics of the materials of which the plug and the fastener are composed. The trapezoidal shape of the grooves also facilitates removing the second cup-shaped piece 24 from a mold if it is manufactured by injection molding. Measured from the first slot 52, the grooves 60-4 are positioned at the following plug-orientation angles:

60A:30°
61A:60°
62A:90°
63A:120°
64A:150°
60B:210°
61B:240°
62B:270°
63B:300°
64B:330°

The second slot 54 is located at 180°. The first end wall 28 similarly has five pairs of grooves in the surface of the end wall 28 facing the cavity 34. The angular positions of the grooves measured from the first slot 42 are the same as the angular positions of the grooves 60-4 in the second end wall listed above.

Figure 4:
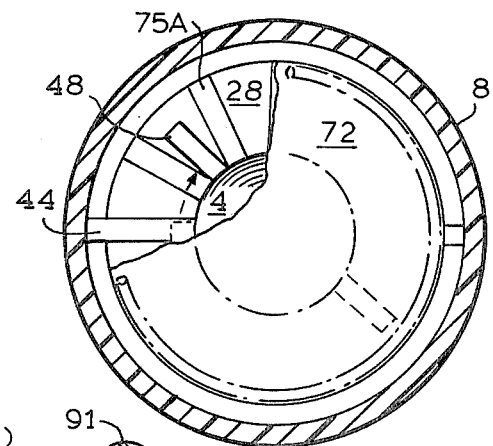
FIG. 4 is a cross section taken substantially along line 4—4 of FIG. 2.

Referring now to FIG. 1, a coil spring 70 is located in the cavity 34 and is maintained under compression between the first and the second end walls 28 and 30. A first contact plate 72 is located between a first end of the coil spring 70 and the first end wall 28. A surface 74 of the first contact plate 72 facing the first end wall 28 defines a first contact surface 74. The smooth planar surface of the first contact surface 74 permits the plug 4 in contact with the surface to be rotated as shown in FIG. 4 to position the tabs 46 and 48 adjacent to a pair of grooves 75A and 75B (not shown). The coil spring 70 exerts a force on the plug 4 in opposition to the direction of insertion to urge the tabs 46 and 48 towards the first end wall 28 and into the grooves 75A and 75B, thereby seating the plug 4 in the fastener 2. Similarly, as may be seen best in FIG. 2, a second contact plate 76 is located between a second end of the coil spring 70 and the second end wall 30. A surface of the second contact plate 76 which faces the second end wall 30 defines a second contact surface 78. The first and the second contact surfaces 74 and 78 intercept plugs inserted respectively through the first and the second plug-receptacle openings 36 and 50.

Referring again to FIG. 1, four offset-indication lines 77A-D are inscribed on the outer surface of the second cup-shaped shell 24. The offset-indication lines 77A-D extend from the lip of the first cup-shaped piece 24 generally parallel to the axis of the housing 8. Adjacent offset-indication lines are separated from one another azimuthally by 5°. A single pointer line 79 is similarly inscribed on the first cup-shaped shell 22. The position of the pointer line 79 adjacent to an offset-indication line indicates the angle by which the grooves in the first end wall 28 are offset from the grooves 60 in the second end wall 30.

An example of a preferred fastener 2 suitable for use with molecular models having a dimension scale of 1

$\overset{\circ}{A}=1.25$ cm has the following approximate dimensions:

| | |
|---|---|
| outside diameter of housing 8 | 10 mm |
| inside diameter of cavity 34 | 7.8 mm |
| diameter of circular openings 38 and 56 | 4.5 mm |
| length of slots 42, 44, 52, and 54 | 1.75 mm |
| axial length of housing 8 | 10 mm |
| axial length of cavity 34 | 3.5 mm |
| axial depth of grooves | 1.5 mm |
| cross-sectional width of grooves perpendicular to the radial direction: | |
| open end | 0.71 mm |
| base | 0.65 mm |

The shank of the plug for use with this fastener is about 4.5 mm in diameter. The tabs have a height of about 1.75 mm in the axial direction, a length of about 1.65 mm in the radial direction, and a blade thickness of about 0.70 mm.

Figure 5:
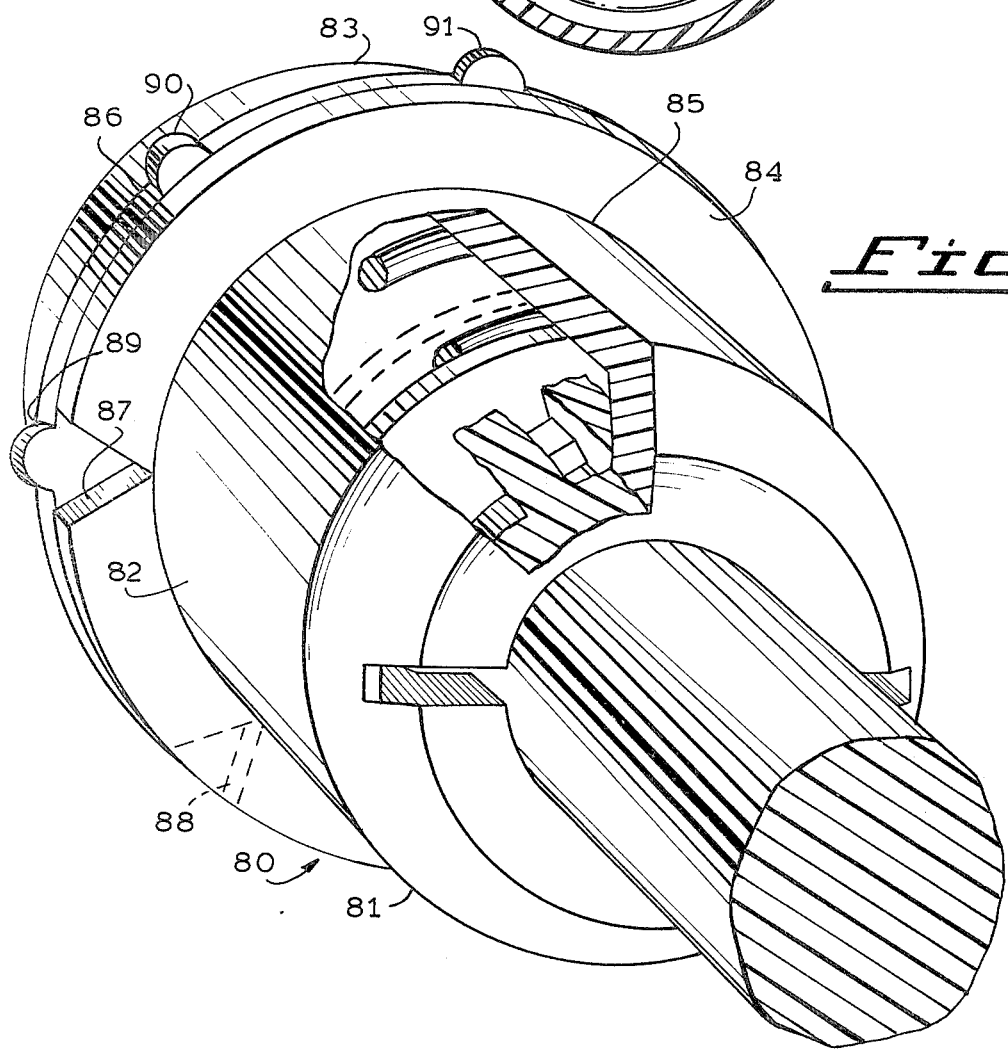
FIG. 5 is a partial-cutaway perspective illustrating a plug seated in a second embodiment of the fastener of the present invention.

Referring now to FIG. 5, a second embodiment of a fastener 80 of the present invention has a housing 81, which is made up of a first cup-shaped shell 82 and a second cup shaped shell 83 ultrasonically welded together. A first annular rim 84 projects radially outwardly from a first lip 85 of the first cup-shaped shell 82, and a second annular rim 86 similarly projects outward from a second lip (not shown) of the second cup-shaped shell 83. The two annular rims 84 and 86 abut one another and provide surfaces for the ultrasonic weld which bonds the two cup-shaped shells 82 and 83. The housing 81 has grooves molded in its end walls at the same angular positions as the grooves of the first embodiment of the fastener 2 discussed above. An indication of the angular offset between corresponding grooves in the two end walls is provided by the alignment of a pointer notch 87 in the first annular rim 84 adjacent to one of an offset-indication notch 88 and three offset indication tabs 89, 90, and 91 in the second annular rim 86. Alignment of the two notches 87 and 88 indicates substantially no offset between corresponding grooves, whereas alignment of the pointer notch 87 adjacent to one of the three tabs 89–91 indicates a 5°, 10°, or 15° offset. Since the grooves are spaced at 30° intervals, the offsets need not be measured relative to a single pair of grooves. Thus the offset-indication notch 88 and the offset-indication tabs 89–91 can be spaced at wide intervals as shown to facilitate reading the offset indicated. The angles of offset are preferably inscribed on the second cup-shaped shell 83 in alignment with the corresponding offset-indication tabs 89–91.

A third embodiment of the fastener of the present invention resembles generally the fastener 2 of FIGS. 1–4, except that the grooves in the first and the second end walls have the following angular positions:

| First End Wall | Second End Wall |
|---|---|
| 15° | 25° |
| 45° | 50° |
| 75° | 75° |
| 105° | 100° |
| 135° | 120° |
| 165° | 155° |
| 195° | 205° |
| 225° | 230° |
| 255° | 255° |
| 285° | 280° |
| 315° | 300° |
| 345° | 335° |

The slots passing through the two end walls are located at angular positions 0° and 180°. In the first end wall the two slots are separated from the closest grooves by 15°, and in the second end wall the closest pairs of grooves are separated by 20°. An advantage of this embodiment is that the relative orientation of two plugs can be set to within ±2.5° of any desired relative orientation using only a single fastener. However, the close angular spacing of certain of the slots and grooves may constitute a disadvantage for applications in which it is desirable that the fastener housing be made of plastic and have a small diameter.

Referring again to FIG. 6, the plug 6 is connected to a first skeletal model 100 of the five-membered ring which is a constituent of the sugar 2-deoxy-D-ribose, which in turn is a constituent of deoxyribonucleic acid (DNA). A shank 101 of the plug 6 is connected at a first end to a carbon-atom site 102 in the first skeletal model 100, extends along a chemical bonding axis of the ring, and is joined at a second end to the plug 4 by the fastener 2. The plug 4 is similarly connected to a carbon-atom site 104 of a second skeletal model 106 of the five-membered ring. The distance between the carbon-atom sites 102 and 104 approximately equals a conveniently-scaled chemical bond distance. The relative orientation of the first and the second skeletal models 102 and 106 can be varied by reorienting either the plug 4 or the plug 6 in the fastener 2.

Figure 7:
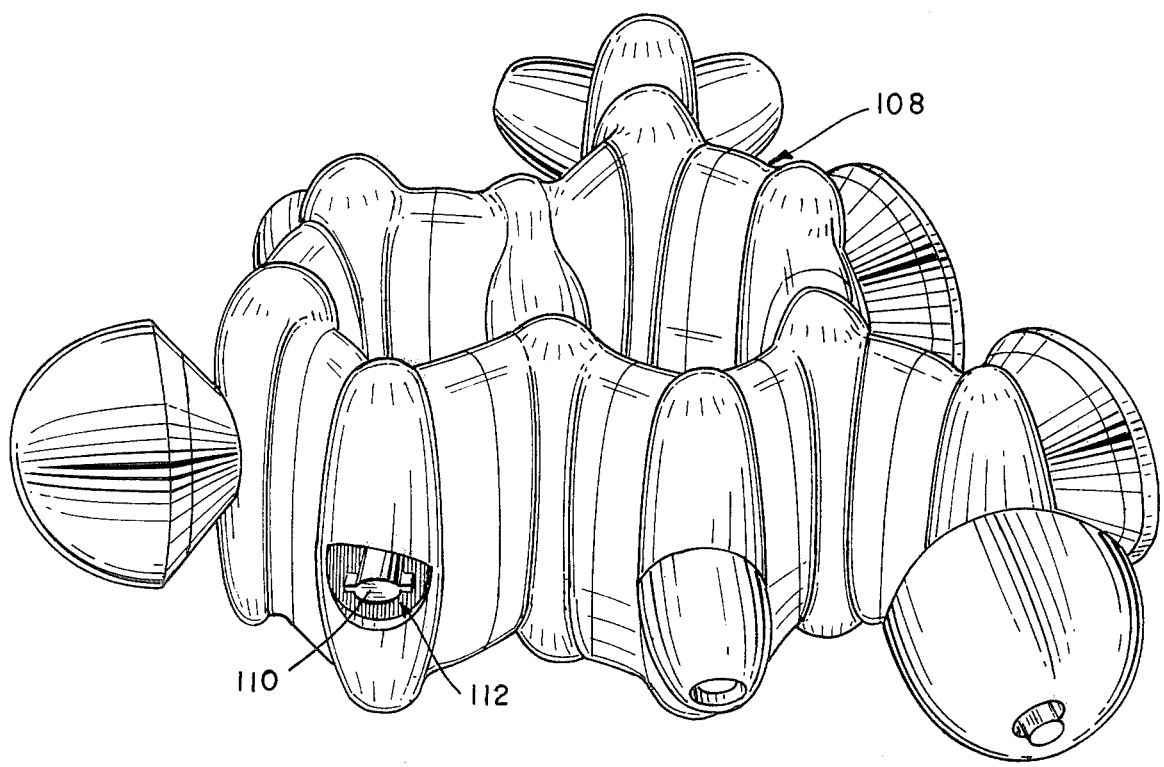
FIG. 7 is a perspective of a model of a molecular constituent of the present invention.

Referring now to FIG. 7, a space-filling model 108 is shown which illustrates a constituent of the base adenine, which in turn is a constituent of DNA. FIG. 7 is identical to FIG. 10 of my copending application for a design patent Ser. No. 828,156. A plug 10 extends through a recessed well 112 of the space-filling model 108 along a chemical-bonding axis of adenine. The inside diameter of the recessed well 112 is larger than the outside diameter of the housing 8 so that the plug 110 can be inserted in the fastener 2. An end of the plug 110 including the tabs projects out a short distance from the outer surface of the space-filling model 108 to permit two such space-filling models to be joined together.

It is not intended to limit the present invention to the specific embodiments described above. For example, the plugs of the present invention can have one tab or three or more tabs, in which case a corresponding number of slots can be included in the plug-receptacle openings in the end walls of the fastener. If the plugs have two tabs and not more, the two tabs need not be separated by 180°. An asymmetric positioning of the two tabs, i.e., positioning at a tab-separation angle of other than 180°, can be advantageous in that in such a case a plug can be inserted in a corresponding fastener in only one orientation, rather than in two orientations as in the case of a symmetric positioning of the tabs. Thus in certain cases an additional orientation of the plug seated in the fastener can be achieved if the two tabs are positioned asymmetrically as opposed to symmetrically. The tabs can have shapes other than rectangular. It will also be appreciated that the grooves in the end walls can have angular positions other than those listed in connection with the specific embodiments described above. The housing of the fastener can be made of a metal such as brass. Metal is a preferred material for the housing if very close spacing of the grooves is desired. It is recognized that these and other changes may be made in the apparatus specifically described herein without departing from the scope and teachings of the instant invention, and it is intended to encompass all other embodiments, alternatives and modifications consistent with the present invention.

I claim:

1. A fastener for joining two plugs in coaxial alignment and in a plurality of relative orientations about the axis of alignment, each plug having:
   (i) a generally cylindrical shank, and
   (ii) at least one tab projecting outward from the surface of the shank;
   the fastener comprising:
   (a) a hollow housing including:
     (a.1) a first end wall;
     (a.2) a second end wall opposing the first end wall; and
     (a.3) a side wall extending between the two end walls;
     the end walls and the side wall defining a cavity within the housing; each end wall having a plug-receptacle opening therein, the plug-receptacle opening including a generally circular opening and at least one slot extending radially outwardly from the circumference of the circular opening, the circular opening being dimensioned and the slot being dimensioned and positioned to receive respectively the shank and the tab of the plug, the plug-receptacle opening thereby permitting an end portion of the plug including the tab to be inserted through the end wall into the cavity, the plug-receptacle openings in the first and second end walls being positioned and oriented to guide plugs inserted through them such that the directions of insertion are substantially collinear; a surface facing the cavity of each end wall having a plurality of grooves therein, one of the surfaces having at least ten grooves therein, the grooves extending radially outwardly from the circumference of the circular opening and being spaced apart azimuthally around the circumference to define a series of plug-orientation angles, the grooves being configured to accommodate the tab; and
   (b) seating means located within the cavity for exerting a force on a plug inserted in the plug-receptacle opening in either end wall in opposition to the direction of insertion to urge the plug towards the end wall, the seating means including:
     (b.1) a compression element;
     (b.2) a first contact surface, and
     (b.3) a second contact surface,
     the first and second contact surfaces positioned to intercept plugs inserted respectively through the plug-receptacle openings in the first and the second end walls, the compression element being located between the first and second contact surfaces so that the force on a plug is transmitted from the compression element to the plug by a contact surface, each contact surface being configured to permit a plug in contact therewith and passing through the plug-receptacle opening to be rotated to position the tab adjacent a groove in the end wall, the seating means thereby being adapted to urge the tab into the groove seating the plug in the fastener.

2. The fastener according to claim 1 in which the angle between any two grooves in an end wall is an integer multiple of 30 degrees.

3. The fastener according to claim 2 in which each groove in the first end wall is offset in angle from a corresponding groove in the second end wall by an integer multiple of 5 degrees.

4. The fastener according to claim 1 in which the compression element is a coil spring maintained under compression by the first and the second end walls of the housing, and the seating means further includes:
   (b.4) a first contact plate located between a first end of the coil spring and the first end wall, a surface of the first contact plate facing the first end wall defining the first contact surface, and
   (b.5) a second contact plate located between a second end of the coil spring and the second end wall, a surface of the second contact plate facing the second end wall defining the second contact surface.

5. A fastener for joining two plugs in coaxial alignment and in a plurality of relative orientations about the axis of alignment, each plug having:
   (i) a generally cylindrical shank, and
   (ii) a first tab and a second tab projecting outward from the surface of the shank, the two tabs being separated from one another in an azimuthal direction to define a tab-separation angle;
   the fastener comprising:
   (a) a hollow housing including:
     (a.1) a first end wall;
     (a.2) a second end wall opposing the first end wall; and
     (a.3) a side wall extending between the two end walls;
     the end walls and the side wall defining a cavity within the housing; each end wall having a plug-receptacle opening therein, the plug-receptacle opening including a generally circular opening and two slots extending radially outwardly from the circumference of the circular opening, the two slots being azimuthally separated from one another by the tab-separation angle, the circular opening and the slots being dimensioned to receive respectively the shank and the tabs of the plug, the plug-receptacle opening thereby permitting an end portion of the plug including the tabs to be inserted through the end wall into the cavity, the plug-receptacle openings in the first and second end walls being positioned and oriented to guide plugs inserted through them such that the directions of insertion are substantially collinear; a surface facing the cavity of each end wall having a plurality of pairs of grooves therein, the grooves extending radially outwardly from the circumference of the circular opening and being spaced apart azimuthally around the circumference to define a series of plug-orientation angles, the two grooves of each pair being azimuthally separated from one another by the tab-separation angle and being configured to accommodate the two tabs; and
   (b) seating means located within the cavity for exerting a force on a plug inserted in the plug-receptacle opening in either end wall in opposition to the direction of insertion to urge the tabs of the plug towards the end wall, the seating means including:
     (b.1) a compression element,
     (b.2) a first contact surface, and
     (b.3) a second contact surface, the first and second contact surfaces positioned to intercept plugs inserted respectively through the plug-receptacle openings in the first and the second end walls, the compression element being located between the first and second contact surfaces so that the force on a plug is transmitted from the compression element to the plug by a contact surface, each contact surface being configured to permit a plug in contact therewith and passing through the plug-receptacle opening to be rotated to position the tabs adjacent a pair of grooves in the end wall, the seating means thereby being adapted to urge the tabs into the grooves seating the plug in the fastener.

6. The fastener according to claim 5 in which the tabs are positioned asymmetrically.

7. The fastener according to claim 5 in which the tab-separation angle is 180 degrees.

8. The fastener according to claim 7 in which the angle between any two grooves in an end wall is an integer multiple of 30 degrees.

9. The fastener according to claim 8 in which each groove in the first end wall is offset in angle from a corresponding groove in the second end wall by an integer multiple of 5 degrees.

10. The fastener according to claim 5 in which the compression element is a coil spring maintained under compression by the first and the second end walls of the housing, and the seating means further includes (b.4) a first contact plate located between a first end of the coil spring and the first end wall, a surface of the first contact plate facing the first end wall defining the first contact surface, and (b.5) a second contact plate located between a second end of the coil spring and the second end wall, a surface of the second contact plate facing the second end wall defining the second contact surface.

* * * * *